United States Patent
Cowherd et al.

(10) Patent No.: US 7,914,288 B2
(45) Date of Patent: Mar. 29, 2011

(54) ON DEMAND LEARNING

(75) Inventors: Kevin Ray Cowherd, Marietta, GA (US); Lynn Dorsett, Scottsdale, AZ (US); Gordon Fuller, Media, PA (US); Nancy J. Lewis, Pleasantville, NY (US); Tony Michael O'Driscoll, Cary, NC (US); Peter Z. Orton, Hillsborough, NC (US); Dick W. Richardson, Charlotte, NC (US); Karen A. Ughetta, Raleigh, NC (US); John Martin Wattendorf, Alexandria, VA (US)

(73) Assignee: International Bussiness Machines Corporation, Armonk, NY (US)

( * ) Notice: Subject to any disclaimer, the term of this patent is extended or adjusted under 35 U.S.C. 154(b) by 548 days.

(21) Appl. No.: 10/960,883

(22) Filed: Oct. 7, 2004

(65) Prior Publication Data

US 2006/0112030 A1 May 25, 2006

(51) Int. Cl.
*G09B 19/00* (2006.01)

(52) U.S. Cl. .................................................. 434/219

(58) Field of Classification Search .................. 434/219
See application file for complete search history.

(56) References Cited

U.S. PATENT DOCUMENTS

| | | | | |
|---|---|---|---|---|
| 4,671,772 | A * | 6/1987 | Slade et al. | 434/219 |
| 6,157,808 | A * | 12/2000 | Hollingsworth | 434/350 |
| 6,341,960 | B1 | 1/2002 | Frasson et al. | 434/322 |
| 6,604,094 | B1 | 8/2003 | Harris | 706/48 |
| 6,606,480 | B1 * | 8/2003 | L'Allier et al. | 434/362 |
| 2002/0076674 | A1 | 6/2002 | Kaplan | 434/107 |
| 2002/0077884 | A1 | 6/2002 | Sketch | 705/12 |
| 2002/0087346 | A1 | 7/2002 | Harkey | 705/1 |
| 2002/0132213 | A1 | 9/2002 | Grant et al. | 434/322 |
| 2002/0169822 | A1 | 11/2002 | Packard et al. | 709/203 |
| 2003/0228561 | A1 * | 12/2003 | Escalante | 434/219 |
| 2005/0042585 | A1 * | 2/2005 | Eskenazi | 434/219 |
| 2005/0181337 | A1 * | 8/2005 | Shaw | 434/219 |

FOREIGN PATENT DOCUMENTS

| | | |
|---|---|---|
| FR | 2803928 A1 | 7/2001 |
| JP | 2000066572 | 3/2000 |
| JP | 2001350854 A | 12/2001 |
| JP | 2003084653 A | 3/2003 |
| KR | 2001077749 | 2/2000 |

(Continued)

OTHER PUBLICATIONS

"Evaluating the Design and Delivery of WWW Based Educational Environments and Coursewares", V. Wade & C. Power, 6th Annual Conference on the Teaching of Computing, Dublin, Ireland, Aug. 17-21, 1998, pp. 243-248.

(Continued)

*Primary Examiner* — Xuan M. Thai
*Assistant Examiner* — Kesha Y. Frisby
(74) *Attorney, Agent, or Firm* — John Pivnichny

(57) ABSTRACT

Learning activities in an organization are allocated for work apart, work embedded, and work enabled learning types. In work apart learning, employees leave the work itself and learn through traditional classroom or technology enhanced methods. Work embedded learning occurs on the job without interrupting the flow of work. Work embedded learning uses the power of experience and execution with small responsive training modules embedded in the work process. Work enabled learning provides knowledge transfer and comprehension through experiences and interactions within the context of the work place. A business process permits an organization to rework existing learning programs and allocate resources for new programs to optimally address employee learning needs.

14 Claims, 6 Drawing Sheets

FOREIGN PATENT DOCUMENTS

| | | |
|---|---|---|
| KR | 2002074241 | 3/2001 |
| KR | 2001103810 | 7/2001 |
| KR | 2001000529 | 10/2001 |

OTHER PUBLICATIONS

U.S. Appl. No. 10/729,761, filed Dec. 5, 2003, "Operationalizing a Learning Solution".

Tortora et al, A Multilevel Learning Management System, SEKE '02, Jul. 15-19, Ischia, Italy, pp. 541-547.

Michael F. McTear, "Spoken Dialogue Technology: Enabling the Conversational User Interface", ACM Computing Surveys, vol. 34, No. 1, Mar. 2002, pp. 90-169.

Shin et al., "A Web-Based, Interactive Virtual Laboratory System for Unit Operations and Process Systems Engineering Education: Issues, Design and Implementation", Computers and Chemical Engineering, vol. 26, Issue 2, Feb. 15, 2002, pp. 319-330.

Morcos et al., "Assessing Student Learning in a Distance Education Environment", Frontiers in Education Conference, Oct. 18-21, 2000, Kansas City, Missouri, vol. 2, p. S3D-5.

Klein et al., "A Process Model for Developing Virtual Education Contents", Wirtschafsinformatik, Germany, vol. 43, Issue 1, Feb. 2001, pp. 35-45, (abstract only).

Melody Ann Williams, "Integrating Concept Mapping Into Science Curriculum and Instructional Practice: Teacher Experiences, Observations, and Recommendations for Future Projects", Journal of Interactive Learning Reserach, 1997, pp. 457-485.

* cited by examiner

ON DEMAND LEARNING

RELATED APPLICATION

This application is related to application Ser. No. 10/729,761 filed Dec. 5, 2003 entitled "OPERATIONALIZING A LEARNING SOLUTION" which is co-owned by the same assignee.

TECHNICAL FIELD

The invention relates generally to the field of learning systems. More particularly the invention relates to methods and systems for allocating resources for learning activities across various learning types.

BACKGROUND OF THE INVENTION

Businesses and other organizations spend a large part of their budget and other resources on learning services. Furthermore, the percentage of budgets devoted to learning services has been growing significantly. Part of this growth is driven by use of technology in corporations. Over the past 30 years, technology has become so essential to corporations that expenditures have grown from five percent of capital spending in 1970 to almost 50 percent today. Consequently, individuals in corporations and other organizations must continually acquire and apply new skills in use of technology, as well as other skill improvements needed to perform their ever changing job functions.

Technological improvements have also enabled new delivery modes of learning as explained in related application Ser. No. 10/729,761 filed Dec. 5, 2003 which is hereby incorporated by reference in its entirety.

Corporate learning organizations put a lot of time, effort, and budget into careful design and delivery of courses to help people do their jobs better. Yet, research shows that between 70 percent and 80 percent of learning actually happens on the job, not in a training room or e-learning course. It is therefore of strategic importance to the firm that this learning channel not be left to chance. Furthermore, organizations need to have methods for allocating resources to learning activities in this new learning channel. It is believed such methods would constitute a significant advancement in the learning services arts.

OBJECT AND SUMMARY OF THE INVENTION

It is therefore a principal object of the present invention to enhance the learning service art by providing a method of allocating resources with enhanced capabilities.

It is another object to provide a system for allocating learning services resources wherein enhanced capabilities are possible.

It is a further object to provide a learning service having enhanced resource allocation capabilities.

These and other objects are attained in accordance with one embodiment of the invention wherein there is provided a method of allocating resources for learning activities in an organization, comprising the steps of, mapping existing learning programs to job categories, defining a desired mix of learning types for each of the job categories, prioritizing the categories, mapping new programs to learning types, mapping the new programs to content types, and for the job categories having a high priority, reworking the existing learning programs into the desired mix of learning types, and allocating resources for new programs according to the mapping to content types.

In accordance with another embodiment of the invention, there is also provided a system for allocating resources for learning activities in an organization, comprising, means for mapping existing learning programs to job categories, means for defining a desired mix of learning types for each of the job categories, means for prioritizing the categories, means for mapping new programs to learning types, means for mapping the new programs to content types, and for the job categories having a high priority, means for reworking the existing learning programs into the desired mix of learning types, and means for allocating resources for new programs according to the mapping to content types.

BEST MODE FOR CARRYING OUT THE INVENTION

Figure 1:
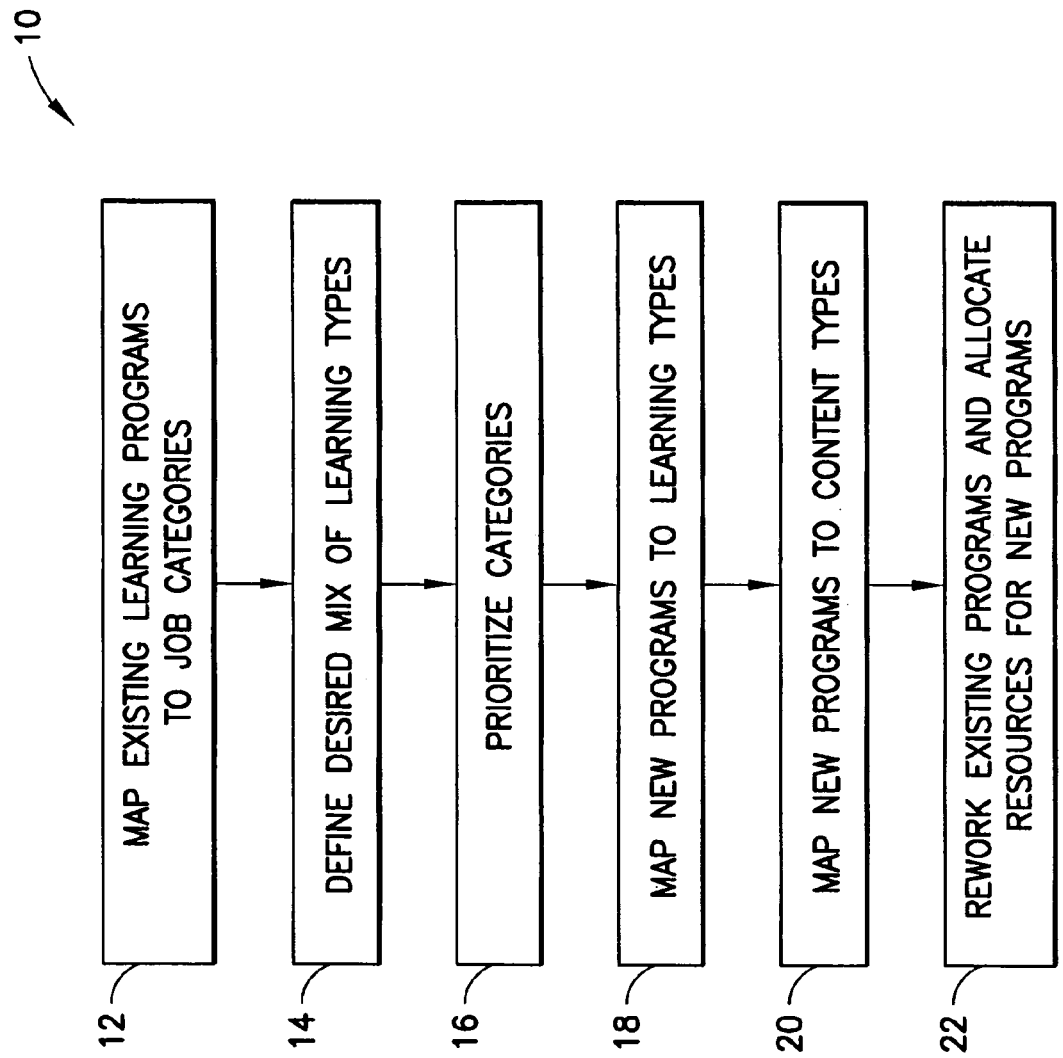
FIG. 1 is a flowchart of steps performed in allocating resources for learning activities in accordance with the present invention.

For a better understanding of the present invention, together with other and further objects, advantages and capabilities thereof, reference is made to the following disclosure and the appended claims in connection with the above-described drawings.

Work apart learning is a term used to denote the traditional approach to business training, in which a learner leaves the work itself, and in the act of learning is removed from the actions of work. Work apart learning once meant only classroom interaction, but now encompasses technology enhanced learning. For example, a blended learning experience as described in application Ser. No. 10/729,761 enables an employee to gain information via intranet web pages, practice skills via web-based simulators, or engage in collaborative learning in virtual team spaces, in addition to the traditional face-to-face classroom experience. A blended learning experience has many advantages such as convenience, just in time access, and multimedia materials. Nevertheless, the employee is separating from the actual work itself, though to a lesser extent than in a workshop or retreat.

Some examples of work apart learning in today's business include:

1. attending a manager workshop on the psychological principles of motivation;
2. participating in a blended learning intervention that requires preparation via the web for classroom activities;
3. reading an article about the banking industry, either hard copy or on a company intranet, to prepare for a customer engagement;
4. viewing and discussing a videotape that models successful sales behaviors.

Two characteristics of work apart learning, denoted as the education driver and observation driver, provide effectiveness to this approach. The education driver represents formal knowledge and skill transfer. Knowledge is transferred in a highly controlled environment, eliminating distractions to allow for safe skill practice and deep reflection on fundamental principles. It enables peer learning, relationship building, and face-to-face role-play practice, and provides an opportunity to learn from mistakes without impacting workplace results. No other form of learning does this quite as well. However, work apart learning interrupts the work. It requires that learners gather away from the workplace in a safe haven where they can reflect and communicate without distractions. While they do, the work stops. Often travel, housing, and other incidental costs are required, that add little to the learning itself.

Furthermore, much of work apart learning is a one-way flow of information that is best done via self-paced e-learning where the student can access and process material at his or her convenience and pace. This then allows valuable face-to-face learning time to be devoted to those in-person activities that are maximized by face-to-face interaction.

The observation driver recognizes that because work apart learning removes itself from the workplace to a vantage point where broader views are possible, it enables and excels at observation. It provides an unhurried platform for detachment and reflection. These activities are essential when learners must grasp relationships and subtle influence, especially in the people-to-people business experiences which typically involve more nuanced behaviors.

Observation anchors learning in a business environment, where adults learn best and where knowledge transfer can be most effective. Learning studies suggest that innovations arise from a cycle in which learners observe and reflect on concrete experiences, form abstract concepts, then are ready to test these concepts in new situations.

But, because the classroom is not part of the workplace, observation in a work apart learning approach requires a simulated work experience. While simulation can be a powerful learning technique, no matter how well designed, it is ultimately artificial, as genuine workplace experience and context is missing. Even multimedia simulations are not the real thing. For example, flight simulators provide pilots with hours of practice, but eventually, hours of actual flight are needed to cement competency gain. Despite the power of a simulation, nothing can completely replace learning a skill within the pressures, influences, and consequences of an actual work environment.

The work apart learning approach therefore remains appropriate in the following situations:
- reflection rather than application is paramount
- insights must be transferred in a non-distracting environment that requires distance from the demands of the work place
- complex human issues or theory must be deeply explored
- access to the workplace will not add much value to the learning
- subject matter is more stable and can be mapped to known skill gaps.

Work apart learning is only moderately effective for skill transfer and behavioral change. It is also less suitable for rapid deployment.

In contrast, work embedded learning is a newer learning approach in which precisely targeted and measured guidance is delivered to employees at the exact moment of need, without interrupting the flow of work. Examples of work embedded learning include:
- using a spell-check tool with a word processing program to ascertain if a word is incorrectly spelled, and instantly correct it if necessary
- opening a help file in an archival database to answer a regulatory question while writing a customer report within that database
- activating an instant messaging connection for an immediate insight during an on-line customer web meeting about a specific product
- consulting an on-line wizard, built into a team meeting space, that provides a step-by-step best practice approach to running the meeting agenda
- accessing a focused, multi-task role-enablement portal to construct a customer solution across multiple business units and functions.

Work embedded learning draws its effectiveness from two drivers, experience and execution.

Experience based learning is highly context oriented and therefore an effective means for transferring procedural knowledge and skills. Best practices can be deliberately implemented within workplace development programs. Carefully designed best practice activities not only enable a learner to acquire insight within a genuine context of work, but also to experience the workplace results. Various studies attest that experiencing the positive results of one's new skills is a powerful reinforcement for acquiring those skills.

Experience based learning has a high rate of successful knowledge and skill transfer. When learning occurs in context, there is a significant reduction in the on-the-job learning curve than would otherwise apply. Workers become more productive more quickly, and understand more intuitively the relationship between the subject matter and the work.

Experience is less successful at building deep comprehension, because it does not inherently allow for the reflection that converts knowledge into understanding. Experience teaches what works rather than why it works. This approach is sufficient for some problems, but is insufficient for transferal to other related and novel applications.

Execution delivers small modules of training that support a worker at the moment that actions must be taken. This makes execution an effective form of performance support. Execution imbeds learning into the workflow, thereby allowing work to proceed with minimal interruption. Under certain conditions execution can accelerate work by making procedures more intuitive.

Because training modules are small and easy to revise, execution can be responsive to rapid changes in subject matter. When a process changes, its supportive learning content can be revised in days or hours, rather than weeks or months and, if delivered electronically, revisions can be instantly deployed worldwide.

Since execution is embedded in the work, there is little time for reflection or big-picture thinking. While it may enable a worker to integrate multiple learning points and tasks, it is typically not used to provide deeper understanding or insight. Like experience, as noted above, execution enables a worker to know what works, rather than why it works. In the example above of a spell-checker, the spelling of an individual word may be learned, but not the general rule or larger sense that allows for an expansion or transferal of learning to other situations.

However, execution does not enable personal prescriptive learning, diagnosed from the workplace. Smart on-line agents can recognize a moment of need, assess its elements, capture the operant requirements, and create a personal and reinforcement for deeper learning to occur later. Thus, execution driver situations, because they identify genuine knowledge and skill gaps, are optimal in creating opportunities for focused use of the work apart learning approach which can occur at another, more appropriate time.

Work embedded learning, therefore, is most appropriate when:
- application, rather than reflection is paramount
- skills must be transferred with the least possible interruption of work
- subject matter is unstable and must be frequently revised
- it is practical to form teams of functional workflow experts, instructional specialists, and application programmers so that learning can be embedded into the work rather than be merely grafted on.

A third learning type known herein as work enabled learning is based on learning experiences in the work environment. Work enabled learning occurs within the workplace where the context is vivid and the teachable moment is immediate.

For example, in a sales organization, the important tasks may be developing a proposal, presenting a proposal to a client, and negotiating a price. A developer of a work enabled learning package for one of theses tasks would start by identifying high sales performers and analyzing what behaviors differentiate these high sales performers on this task from average performers. The developer defines these differentiating behaviors and then identifies experiences that the learner must have to enhance his proficiency in these differentiating behaviors. The experiences are work experience which may include learning interaction among peers, learners, and mentors. These learning interactions take place within the workplace context, connecting learners with the expertise of high performers.

The developer of a work enabled learning package will list work environment experiences needed to lead a learner through four critical steps in the work enabled learning process. The learner prepares for a task or activity by reviewing what is needed from a skill-knowledge perspective. The learner then engages in an activity (observation, execution, or combination). The learner then reflects upon the experience of having observed or engaged in a work activity. Finally, the learner reviews the experience with a mentor who can further coach and guide the learner on how to refine expertise in this task.

The experiences identified above may be posted on a learning system and organized by task or typical area. A learner logs onto the system, selects a topic/task and is led through the four-step process. The experiences may include identification of work related interactions in which learning occurs including:
- teaming—bringing together employees with diverse perspectives, skills, and responsibilities to address organizational problems or goals
- meetings—formal and informal gatherings promoting learning through open discussion and airing of opinions
- mentoring—loosely structured interactions between an experienced employee and the learner
- peer-to-peer communication—water cooler or coffee interactions of employees at all levels, goal related or casual, including transfer of insights and perspectives
- customer interactions—feedback from clients and prospects that shape behavior and understanding.

These workplace experiences include interactions via e-mail, telephone, virtual spaces, and in person.

In contrast to work embedded learning where the emphasis is on supporting the execution of an ongoing task, work enabled learning uses the work environment to provide experiences for learning. Work enabled learning, therefore, amplifies the transfer of skill and knowledge, accelerates the deployment of best practices in the workplace, and facilitates learning interactions among workers within the workplace.

In an organization such as a large company, there is an on-going need for learning by the organization's members, e.g. employees. Some method must be used to decide what types of learning activities are needed, whether they be work apart learning, work embedded learning, or work enabled learning. Then the organization must allocate financial and development resources to acquiring, creating, or deploying these learning activities. In FIG. 1, there is shown a flowchart 10 depicting steps of such a method in accordance with the present invention.

Figure 2:
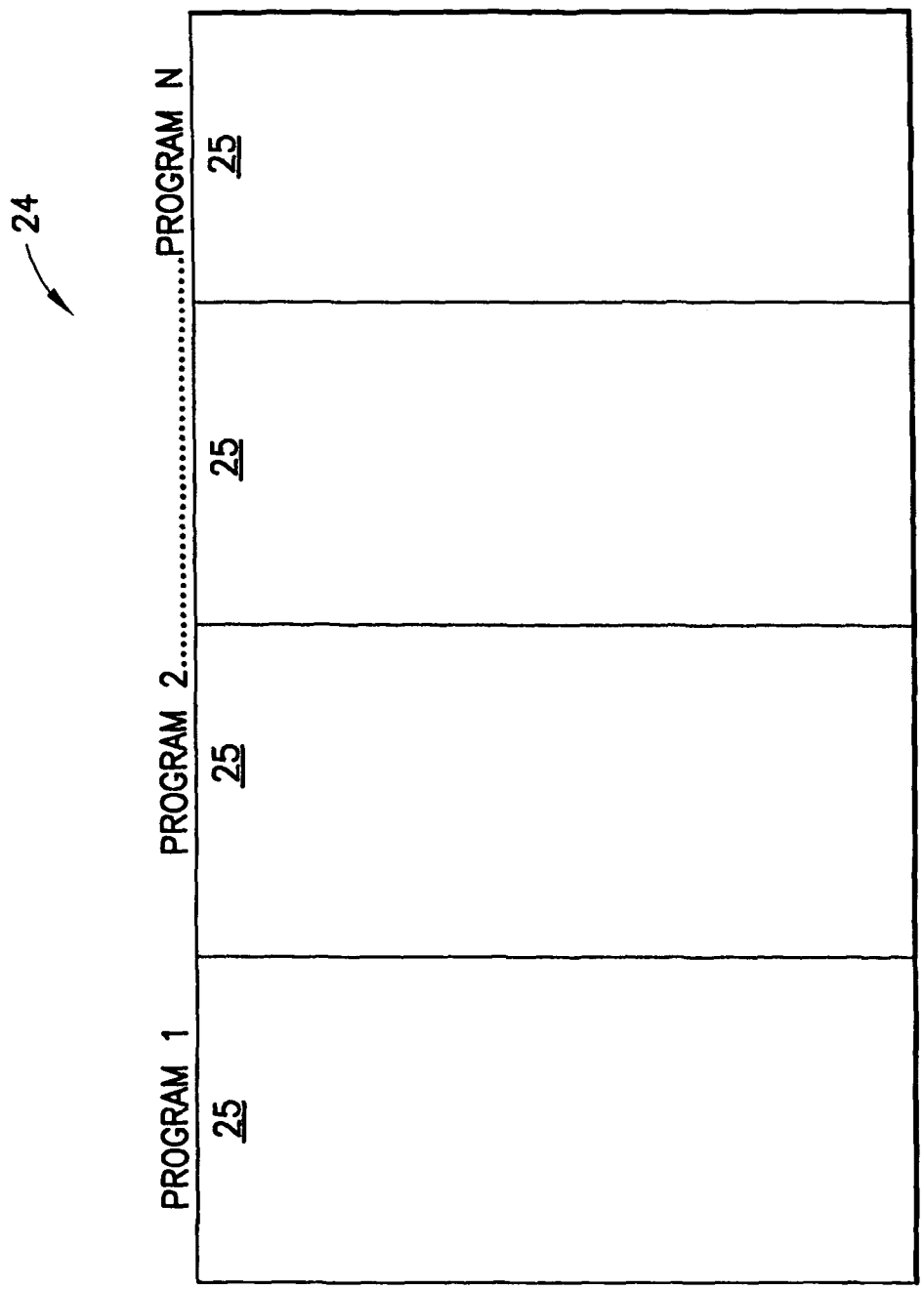
FIGS. 2-6 are spreadsheets or matrices of data developed while performing the steps of FIG. 1.

In step 12, existing learning programs are mapped to job categories. The job categories represent actual jobs held by employees in the organization. Each organization may have its own listing of job categories, or a common set may be used. For example, FIG. 2 shows a matrix 24 or spreadsheet having rows labeled with job categories for a large information technology company. Each existing learning program, Program 1, Program 2, . . . Program N is mapped into the job categories listed in FIG. 2 with its own column 25 in the spreadsheet. The mapping may be performed by entering numbers such as percentages or dollar amounts in the appropriate spreadsheet cell for that existing program and job category. Any other type of mapping known in the art may be used including entering training hours, or number of employees or the like.

Figure 3:
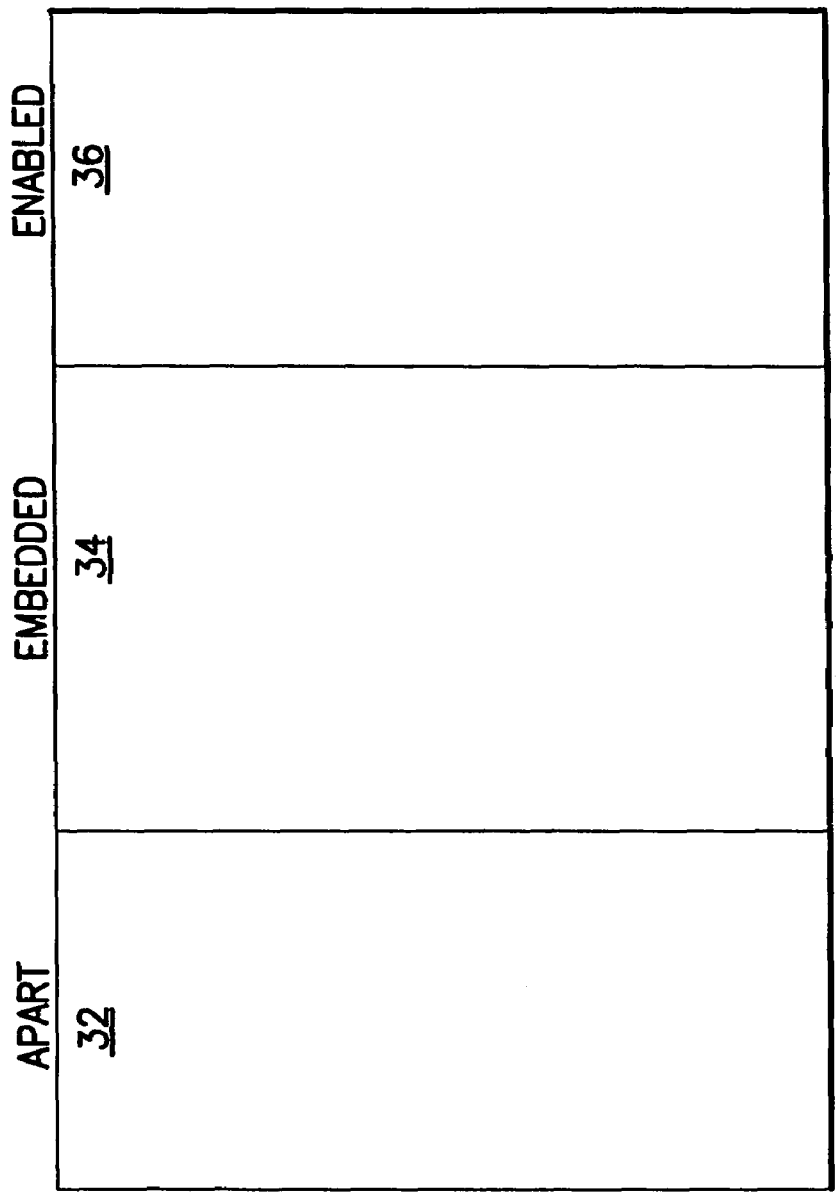

In step 14, the desired mix of learning type is defined for each job category. FIG. 3 shows a matrix 30 or spreadsheet which may be used to perform this step. For example, the desired amount of learning resources for employees in the finance job category can be defined by entering percentages or dollar amounts in the spreadsheet of FIG. 3 in columns 32, 34, and 36 to define the desired mix of learning into work apart learning, work embedded learning, and work enabled learning respectively. The information given above for which learning types excel in which situations may be used along with that job category needs to define the desired mix. As above, entries in the matrix 30 or spreadsheet of FIG. 3 may be in any units of mix known in the art, such as percentages, dollar amounts, number of employees, ranking, or the like.

Figure 4:
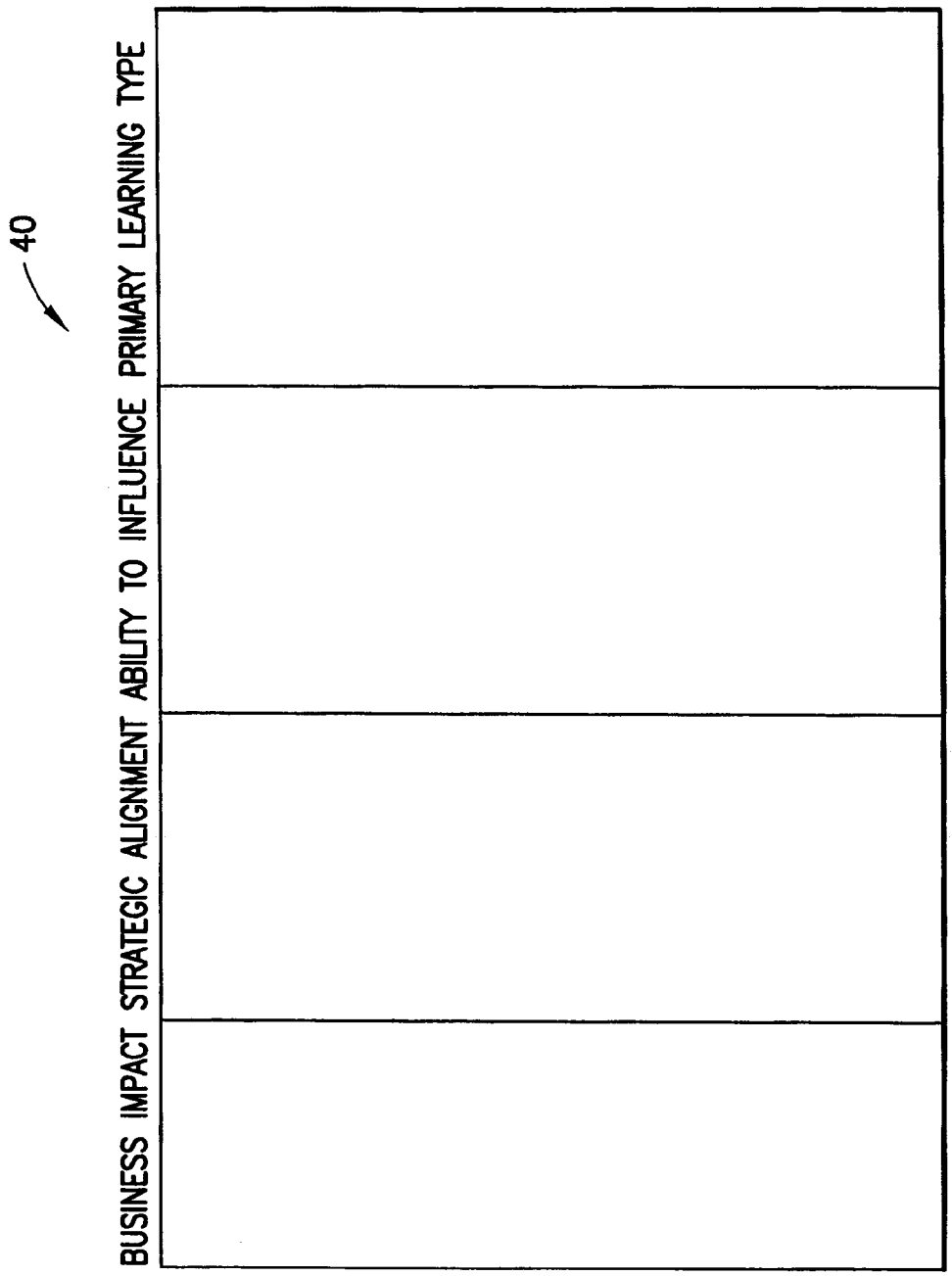

In step 16, the job categories are prioritized according to several criteria. For example, in FIG. 4, prioritization is done based on the criteria of business impact, strategic alignment, ability to influence, and primary learning type. Other criteria may be used in any particular learning situations. Priorities may be entered, for example, into columns of a spreadsheet or matrix, 40 of FIG. 4.

Figure 5:
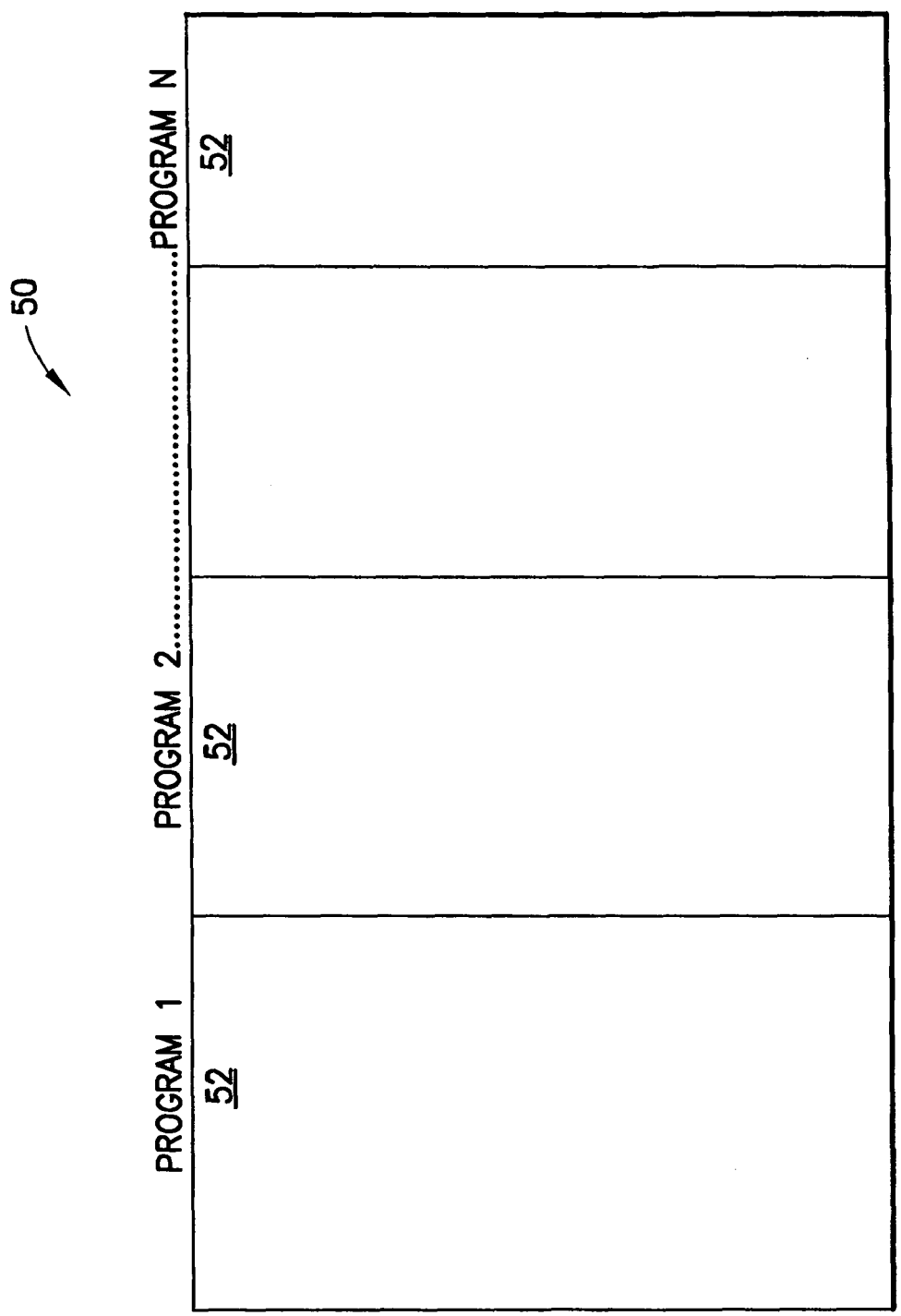

In step 18, new learning programs are mapped into the desired level of work apart, work embedded, and work enabled learning types. A matrix or spreadsheet 50 as shown in FIG. 5 may be used to enter the mapping data in respective columns 52 for each new program. Mapping data is derived from the desired mix spreadsheet of step 14 and existing programs map of step 12. As noted above the data entered in matrix 50 may be in any units, known in the art such as, but not limited to dollars, hours, or percentages.

Figure 6:
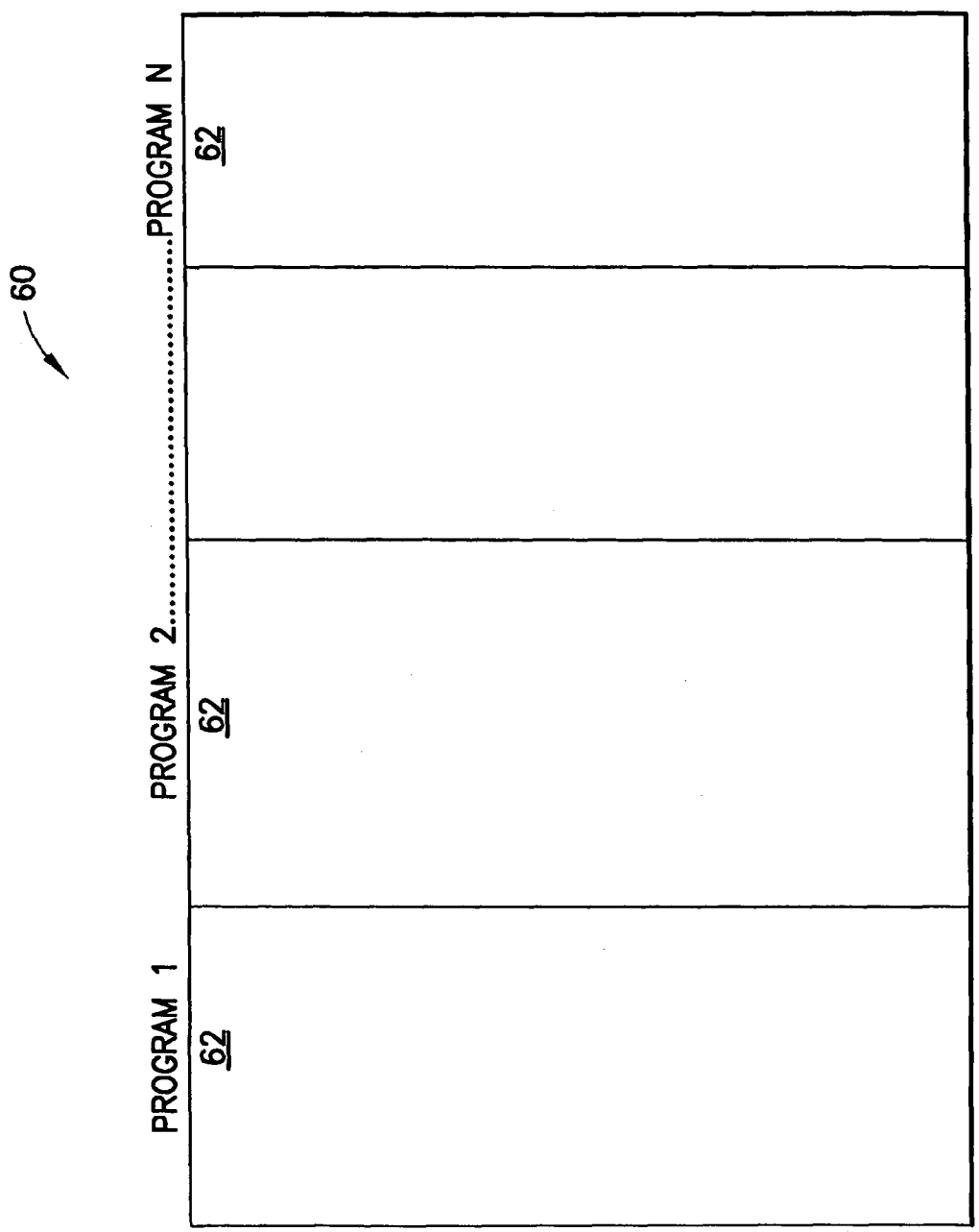

In step 20, the desired levels of learning types are further mapped into content types. Examples of content types for each of the learning types are shown in the row labels of spreadsheet or matrix 60 in FIG. 6. The data for each of the learning types in spreadsheet 50 is essentially subdivided into the content types in spreadsheet 60 by entering the subdivided data into the respective columns 62 for each program.

Having completed all of the spreadsheets above, finally in step 22, existing programs are re-worked and resources are allocated to new programs to bring total learning resources in line with the desired mix defined in step 14.

The resources allocated to new programs may be used to procure learning packages of the work apart, work embedded, or work enabled types. The resources may also be used to develop new packages in these three types. For example, a work enabled package for a particular learning assignment may be developed using the following steps.

identify related business objectives
    identify required change to achieve the learning objectives
    identify knowledge and comprehension level required
    identify learning activities in the work environment to leverage and enhance learning at the appropriate level
    identify and assemble or create necessary learning support
    identify questions for reflection to focus and enhance learning following completion of workplace learning activity
    identify questions and learning support to aid a coach in conducting after action reviews to embed and elaborate learning
    create guided, structured learning assignment.

Other methods of developing new packages for a particular learning assignment may also be used in step 22.

Embodiments of the present invention can be implemented as a computer program product for use with a computer system. Such an implementation may include a series of computer instructions fixed either on a tangible medium, such as a computer readable medium (e.g. a diskette, CD or DVD ROM, a ROM, or fixed disk) or transmittable to a computer system, via a modem or other interface device, such as a communications adapter connected to a network over a medium. The medium may be either a tangible medium (e.g. optical or electrical communication lines) or a medium implemented with wireless, radio waves, infrared or microwave techniques.

The series of computer instructions embodies all or part of the functionality previously described above. Those skilled in the art should appreciate that such computer instructions can be written in a number of programming languages for use with many computer architectures or operating systems. Furthermore, such instructions may be stored in any memory device, such as semiconductor, magnetic, optical or other memory devices and may be transmitted using any communications technology, such as optical, infrared, microwave, sneaker net, or other transmission technologies. It is expected that such a computer program product may be distributed as a removable medium with or without accompanying printed or electronic documentation (e.g. shrink wrapped software), preloaded with a computer system (e.g. on system ROM or fixed disk), or distributed from a server over a network (e.g. the Internet or World Wide Web). Some embodiments of the invention may be implemented as a combination of software (e.g. computer program product) and hardware (mechanisms or apparatus). Still other embodiments of the invention may be implemented as entirely hardware or entirely software.

While there have been shown and described above what are at present considered the preferred embodiments of the invention, it will be obvious to those skilled in the art that various changes and modifications may be made therein without departing from the scope of the invention as defined by the appended claims.

What is claimed is:

1. A computer system comprising a communications adapter connected to a network over a medium, a CPU, a computer screen, and a memory having computer instructions for implementing a method of providing learning activities in an organization, including computer instructions for operating one or more spreadsheet databases, said method comprising the steps of:

mapping existing learning programs to job categories in a computer spreadsheet, said spreadsheet operating on said system;

defining a desired mix of learning types, said learning types consisting of work apart, work embedded, and work enabled learning types, for each of said job categories in said computer spreadsheet;

prioritizing said categories by entering priorities in the columns of said computer spreadsheet based on a criteria consisting of business impact, strategic alignment, ability to influence, or primary learning type;

mapping new programs to said work apart, work embedded, or work enabled learning types by entering mapping data in the desired mix spreadsheet;

mapping said new programs to content types in said computer spreadsheet;

for said job categories having a high priority, reworking said existing learning programs into said desired mix of learning types, and allocating resources for new programs according to said mapping to content types;

procuring learning packages or developing new packages of said work apart, work embedded, or work enabled learning types by using the allocated resources; and displaying on said computer screen said mapping including the procured packages or developed new packages.

2. The computer system of claim 1, wherein said work apart learning type consists of learning activities performed separate from doing a job in one of said job categories.

3. The computer system of claim 1, wherein said work enabled learning type consists of learning acquired from experience doing a job in one of said job categories.

4. The computer system of claim 1, wherein said work embedded learning type consists of integration of modularized learning content embedded into workflow for one of said job categories.

5. The computer system of claim 1, wherein said mapping consists of defining the elements of a matrix or spreadsheet.

6. The computer system of claim 1, wherein said desired mix is defined by percentage of resources.

7. The computer system of claim 1, wherein said mapping of new programs further consists of mapping by percentage of resources for learning activities.

8. A computer program product embodied in a computer readable diskette, CD or DVD ROM, a ROM, or fixed disk, for operating in a system comprising a communications adapter connected to a network over a medium, a CPU, a computer screen, and a memory having computer instructions for implementing a method for allocating resources for learning activities in an organization, including computer instructions for operating one or more spreadsheet databases, said method comprising:

computer spreadsheet means operating in said system for mapping existing learning programs to job categories;

computer spreadsheet means operating in said system for defining a desired mix of learning types, said learning types consisting of work apart, work embedded, and work enabled learning types, for each of said job categories;

computer means for prioritizing said categories by entering priorities in the columns of said computer spreadsheet based on a criteria consisting of business impact, strategic alignment, ability to influence, or primary learning type;

computer means for mapping new programs to said work apart, work embedded, or work enabled learning types by entering mapping data in the desired mix spreadsheet;

computer spreadsheet means operating in said system for mapping said new programs to content types;

for said job categories having a high priority, computer means for reworking said existing learning programs into said desired mix of learning types, and computer means for allocating resources for new programs according to said mapping to content types; and displaying on said computer screen the allocated resources for new programs according to said mapping to content types.

9. The computer program product of claim 8, wherein said work apart learning type consists of learning activities performed separate from doing a job in one of said job categories.

10. The computer program product of claim 8, wherein said work enabled learning type consists of learning acquired from experience doing a job in one of said job categories.

11. The computer program product of claim 8, wherein said work embedded learning type consists of integration of modularized learning content embedded into workflow for one of said job categories.

12. The computer program product of claim 8, wherein said means for mapping consists of means for defining the elements of a matrix or spreadsheet.

13. The computer program product of claim 8, wherein said desired mix is defined by percentage of resources.

14. The computer program product of claim 8, wherein said means for mapping of new programs further consists of means for mapping by percentage of resources for learning activities.

* * * * *